April 8, 1952 R. L. COSGRIFF ET AL 2,591,921
ELECTROMAGNETIC BALANCE ACCELEROMETER
Filed May 28, 1949 3 Sheets-Sheet 1

INVENTORS.
ROBERT L. COSGRIFF
BY EDWARD L. WALLS, JR.
Richard W. Treverton
ATTORNEY.

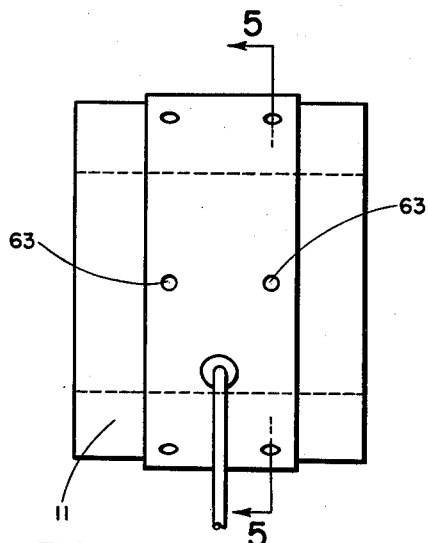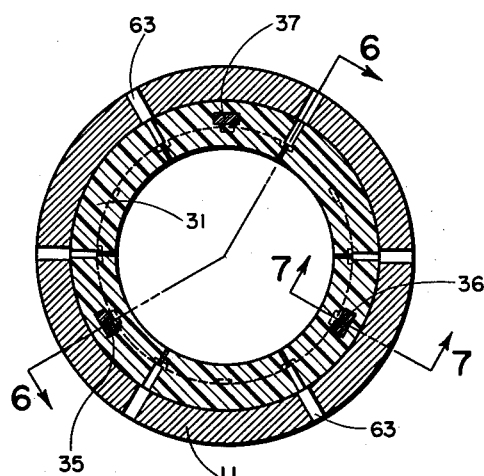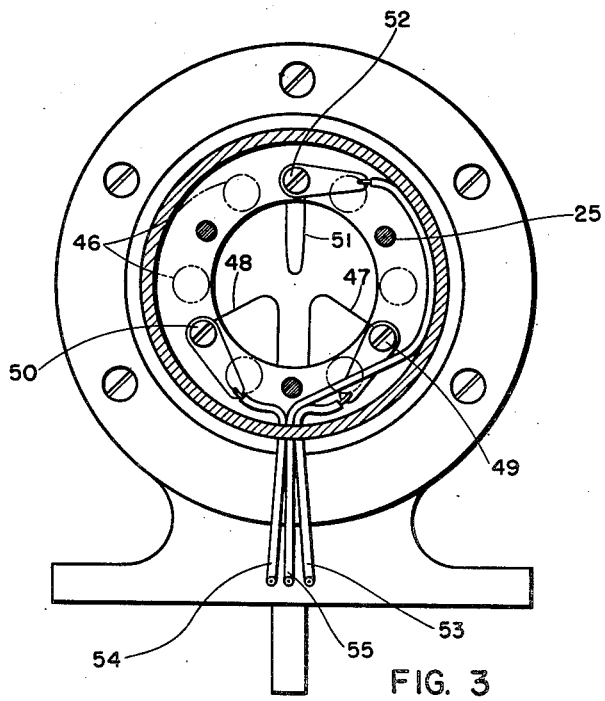

April 8, 1952 R. L. COSGRIFF ET AL 2,591,921
ELECTROMAGNETIC BALANCE ACCELEROMETER
Filed May 28, 1949 3 Sheets-Sheet 3

INVENTORS.
ROBERT L. COSGRIFF
BY EDWARD L. WALLS, JR.
Richard W. Treverton
ATTORNEY.

Patented Apr. 8, 1952

2,591,921

UNITED STATES PATENT OFFICE 2,591,921

ELECTROMAGNETIC BALANCE ACCELEROMETER

Robert L. Cosgriff and Edward L. Walls, Jr., Columbus, Ohio, assignors to Curtiss-Wright Corporation, a corporation of Delaware Application May 28, 1949, Serial No. 95,898

9 Claims. (Cl. 264—1)

1

The present invention relates to an accelerometer in which electromagnetic means balance acceleration applied to a sensing element, the current which energizes the electromagnetic means thus becoming a measure of the acceleration and itself being readily measured by a suitable galvanometer or the like. The accelerometer includes a capacitance pickoff which is adapted to control the current supply for the electromagnetic means in accordance with displacements of the sensing element.

The magnetic frame of the device is formed to provide a pair of axially spaced annular gaps traversed radially by the magnetic lines of force; and the acceleration sensing element is of tubular form, with its ends arranged in the annular gaps and containing coils which are electrically energized to produce the acceleration balancing force. The tubular element is suspended for axial motion upon a film of gas, or gas bearing, that is maintained between telescoping dielectric bodies which are provided on the frame and on the tubular element. Embedded in these dielectric bodies on opposite sides of the gas film are the condenser plates of the capacitance pickoff.

The capacitance pick-off is sensitive to very small displacements of the movable element of the accelerometer, and the electromagnetic means respond rapidly to signals from the pickoff, so that the amount of displacement of the movable element is very small. The gas bearing imposes virtually no frictional resistance when the motion between the supporting and supported elements is very small, and the accelerometer is therefore highly sensitive and enables accurate measurements even of accelerations of very small magnitude. Furthermore, since the balancing force of the electromagnetic means can be made large in relation to the mass of the sensing element, the accelerometer can be used to measure acceleration forces over a wide range of magnitudes.

The acceleration sensitive element arranged concentrically within the magnetic frame is the only moving part of the device; and the only movable bearing surfaces are the cylindrical surfaces of the single air bearing which supports this moving part. The invention thus provides an arrangement that is compact, is simple to construct and is susceptable of low cost manufacture.

The foregoing and other objects and advantages will become apparent from the following description of the accelerometer shown in the accompanying drawings, wherein:

2

Fig. 1 is an enlarged longitudinal vertical sectional view;

Figs. 2 and 3 are transverse sectional views taken respectively along lines 2—2 and 3—3 of Fig. 1;

Fig. 4 is a side elevational view of the part of the frame which contains the gas bearing;

Fig. 5 is a transverse sectional view taken along line 5—5 of Fig. 4;

Figure 9:
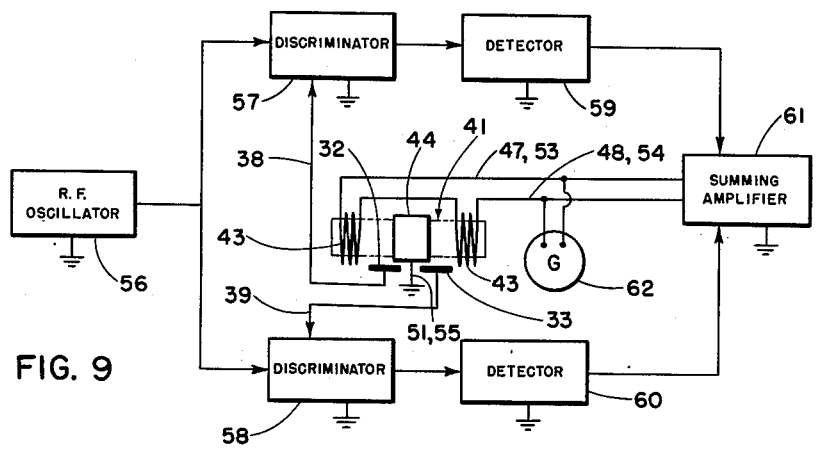
Figure 8:
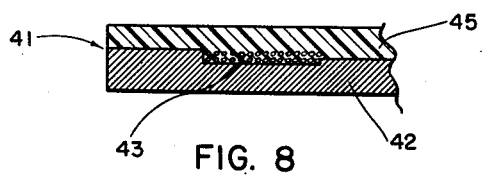
Figures 6, 7:
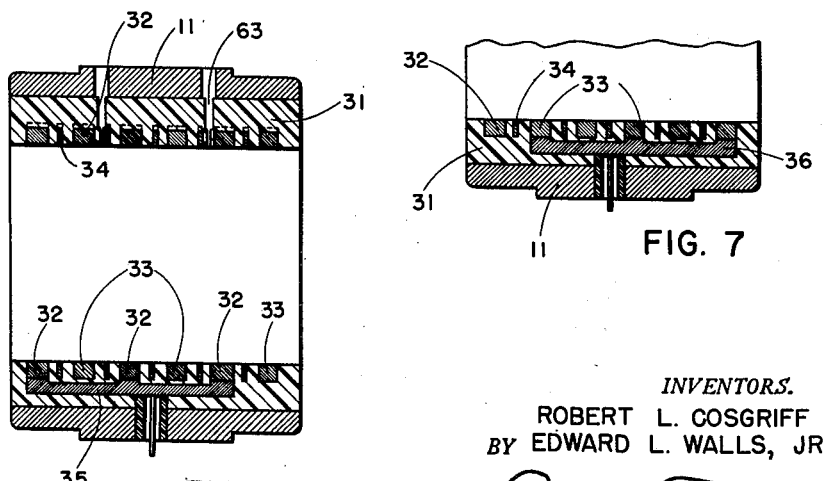

Figs. 6 and 7 are longitudinal sectional views taken along lines 6—6 and 7—7 respectively of Fig. 5;

Fig. 8 is a longitudinal sectional view on a magnified scale of an end fragment of the acceleration sensing element; and, Fig. 9 is a diagrammatic view of an electric circuit arrangement for the accelerometer.

The outer section of the magnetic frame of the accelerometer is made of soft iron and comprises a tubular shell 11 to whose ends ring shaped pole pieces 12 and 13 are secured by a press fit or other fluid tight connection. The core of the frame is cylindrical and consists of a permanent magnet 14 having soft iron pole pieces 15 and 16 at its opposite ends. Pole piece 15 is mounted upon an end casing element 17 which in turn is secured, by fasteners 18, to the end ring 12. The casing of the accelerometer further includes an opposite end ring 19 secured by fasteners 20 to ring 13 and an outer tubular jacket 21. The housing still further includes a tubular member 22 secured to end ring 19 by fastener 23, and an end closure plate 24 secured to member 22 by fasteners 25. The casing parts 17, 19, 21, 22 and 24 preferably are formed of aluminum or other suitable non-magnetic material.

Sealing rings 26 are confined in peripheral grooves in the frame pole rings 12 and 13 to seal an annular chamber 27 that is provided between members 11 and 21. Air or other gas under pressure from a suitable source may be introduced into chamber 27 through a nipple 28 that is connected to the outer jacket 21 by means of a plate 29 and fasteners 30. A dielectric bearing sleeve 31 is mounted within the iron shell 11, and through these parts extend small radial openings 63, Fig. 5, to direct gas from the chamber into the gas bearing within the sleeve 31. The inner surface of this sleeve preferably is a flush continuation of the cylindrical inner faces of pole rings 12 and 13.

Figure 2:
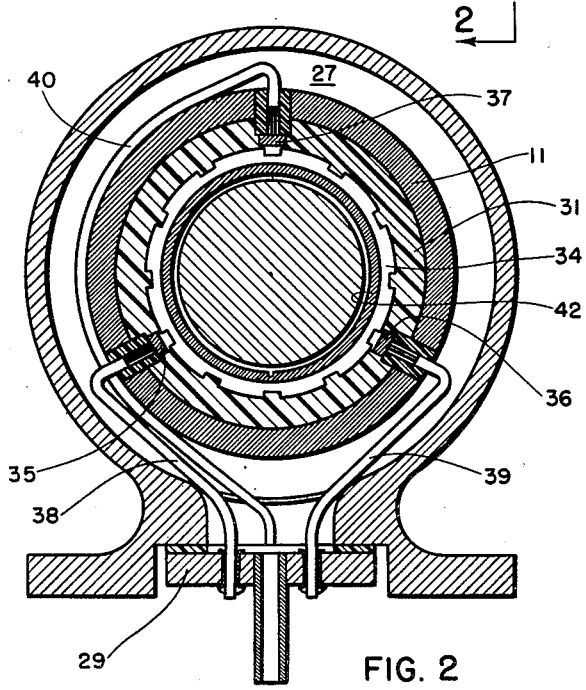

As best shown in Figs. 5, 6, and 7, a plurality of ring shaped metallic condenser plates 32 and 33, and intermediate metallic guard rings 34, are embedded in the dielectric sleeve 31. The plates 32 are electrically connected by a bar 35, the alternate plates 33 by another bar 36, and the guard rings 34 by still another bar 37. Insulated wires 38 and 39 respectively connected to bars 35 and 36 extend from the housing of the accelerometer through openings in plate 29, as shown in Fig. 2, while a wire 40 connected to bar 37 is grounded to jacket 21.

The tubular acceleration sensitive element, indicated generally by numeral 41, is arranged for axial movement in the annular space surrounding the core 14, 15, 16 and within the cylindrical inner surface of dielectric sleeve 31 and pole rings 12, 13. The element 41 consists of an aluminum tube 42 upon whose end portions are wound coils 43 of insulated wire, the coils being so spaced that one is situated in the gap between pole pieces 12 and 15 and the other in the gap between pole pieces 13 and 16. Portions of the tube 42 that are axially situated between adjacent pairs of plates 32 and 33 are thickened to provide annular ridges 44 which constitute intermediate condenser plates. A dielectric jacket 45 is cast over the outside surface of the tube, embedding the coils 43 to hold them in assembly and providing the sensitive element with a smooth outer surface that is flush with the outer cylindrical peripheries of ridges 44. A small clearance is provided between this outer surface of element 41 and the adjacent cylindrical surface of sleeve 31 and pole rings 12 and 13. This clearance, which is on the order of fifteen ten-thousandths of an inch when the diameter of the sensitive element is on the order of seven-eighths of an inch, contains a film of gas or gas bearing, upon which the sensitive element floats. The spent gas exhausts from the casing of the accelerometer through openings 46 in the casing end members 17 and 24.

Small insulated wires 47 and 48 connected to the ends of coils 43 are embedded in the dielectric jacket 45 and extend therefrom to binding posts 49 and 50, respectively. The portions of wires 47 and 48 between the two coils extend in a narrow axially extending groove formed on the inner surface of tube 42. Another wire, 51, is connected to the metal tube 42 and extends to a binding post 52. From the three posts lead wires, respectively designated 53, 54 and 55, extend to the electric current supply and control system.

The details of the apparatus making up this system are not a part of the present invention, and since such apparatus is well known in the art, the system is shown only in diagrammatic form in Fig. 9. It comprises a radio frequency oscillator 56, discriminators 57 and 58, detectors 59 and 60, a direct current summing amplifier 61 and a galvanometer 62. The radio frequency output of the oscillator is fed to both of the discriminators, each of which functions to amplitude modulate its radio frequency output in accordance with the capacitance of its control condenser, this being the control condenser comprising elements 32 and 44 for the discriminator 57 and the control condenser comprising elements 33 and 44 for the discriminator 58. The amplitude modulated outputs of the discriminators are fed respectively to detectors 59 and 60, each of which applies to amplifier 61 a direct current potential corresponding to the modulation imposed by the related discriminator. The output of the amplifier 61 is a direct current whose sign and potential reflect the difference between these two applied direct current potentials, and this direct current amplifier output is applied to the coils 43 through the wires 47, 48 and is also applied to galvanometer 62.

Figure 1:
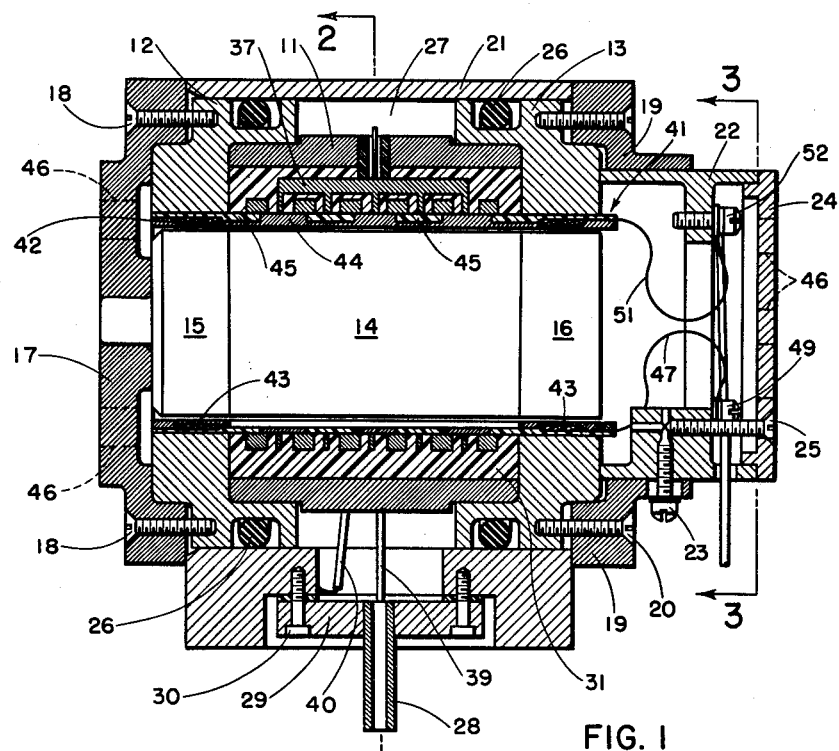

In operation, with the nipple 28 connected to a source of gas pressure so that element 41 is suspended on a gas film, the output of amplifier 61 will be zero so that no current will flow through coils 43 so long as the ridge-like plates 44 remain in neutral position, symmetrically disposed relative to plates 32 and 33. When the accelerometer is subjected to an axial acceleration, say to the right in Fig. 1, the plates 32 shift into closer coupling with plates 44 because of the inertia of element 41, and the capacitance of the condenser comprising plates 32 and 44 thus increases and that of the condenser comprising plates 33 and 44 decreases. This will result in the output voltages of discriminator 57 and detector 59 increasing, while the output voltages of discriminator 58 and detector 60 decrease. This will in turn result in amplifier 61 applying a potential across coils 43, so energizing the latter that a mechanical force is applied to element 41 in a direction tending to restore it to its neutral position relative to the frame. Since this potential increases with increased difference between the two capacitances resulting from continued axial displacement of the element 41, and decreases during restoring movement of the latter, there quickly results a condition of balance wherein the electromagnetically applied balance force equals the acceleration applied to element 41. Since the balance force is proportional to the potential across the coils 43, the galvanometer 62, which measures this potential, also measures the acceleration force, and, if desired, the galvanometer scale may be calibrated to read directly in units of gravity or acceleration. Or, if employed in a control system, the galvanometer may be in the form of a relay or the like.

It will be understood that the foregoing description of the accelerometer and its mode of operation is set forth by way of illustration and explanation of the invention and not by way of limitation. The principles of the invention may be employed in various other physical embodiments without departing from the spirit of the invention, or from the scope thereof as defined in the appended claims.

We claim as our invention:

1. An accelerometer for use with an electric current supply means whose output potential may be varied by changing the capacitance of a condenser that is electrically connected therewith, said accelerometer comprising a fixed frame providing a magnetic circuit having two axially spaced annular gaps traversed radially by magnetic lines of force, a tubular acceleration responsive member coaxial with said gaps and carrying coils disposed respectively within said gaps, electrical conductors extending from said coils and adapted for connection with said current supply means for energizing said coils to provide electromagnetically a force to counterbalance accelerations applied axially to said member, a condenser comprising a plurality of plates of which at least one is carried by said member and at least another is carried by said frame, said plates being disposed within the frame between said two gaps and so arranged relative to one another that the capacitance of the condenser is varied upon axial motion of said member, electrical conductors extending from said condenser and adapted for connection to said current supply means for varying the potential thereof applied to said coils, said frame and said member having telescoping surfaces with clearance therebetween for defining a gas bearing space, and fluid passage means extending through the frame into said space for directing gas under pressure into the latter to provide a gas bearing suspending the member for axial motion.

2. An accelerometer for use with an electric current supply means whose output potential may be varied by changing the relative capacitance of condensers that are electrically connected therewith, said accelerometer comprising a fixed frame providing a magnetic circuit having two axially spaced annular gaps traversed radially by magnetic lines of force, a tubular acceleration responsive member coaxial with said gaps and carrying coils disposed respectively within said gaps, electrical conductors extending from said coils and adapted for connection with said current supply means for energization thereby to provide electromagnetically a force to counterbalance accelerations applied axially to said member, condenser means comprising a plurality of plates of which at least two plates are carried in spaced relation to each other by said frame and at least one plate is carried by said member, said plates being disposed between said two gaps and so arranged relative to one another that the relative capacitance of said two plates is varied upon axial motion of said member, electrical conductors extending from said plates and adapted for connection to said current supply means for varying the potential thereof applied to said coils, said frame and said member having telescoping surfaces with clearance therebetween for defining a gas bearing space, and means for directing gas under pressure through said frame surface into said space to provide in the latter a gas bearing suspending the member for axial motion.

3. In an electromagnetic balance accelerometer having a capacitance pickoff, a fixed frame providing a magnetic circuit having axially spaced annular gaps traversed radially by magnetic lines of force, a first dielectric body mounted within the frame between said gaps and having a cylindrical surface coaxial with said gaps, a plurality of axially spaced ring shaped condenser plates coaxial with said gaps and embedded in said first dielectric body, an acceleration sensitive element comprising a non-magnetic metallic tube coaxial with said gaps and having at least one annular ridge formed thereon for coaction as a condenser plate with the aforementioned condenser plates, a pair of coils carried by said tube with one thereof disposed within each of said gaps, a second dielectric body formed upon one surface of the tube, said second dielectric body embedding said coils and having a cylindrical surface in telescoping relation to the cylindrical surface of said first dielectric body, there being clearance provided between said telescoping surfaces, means providing a gas pressure chamber extending around said frame, and a plurality of openings through said frame, and through said first dielectric body between adjacent ones of said plates embedded therein, for directing gas under pressure into said clearance space for suspending the acceleration sensitive element for axial motion within the frame.

4. In an electromagnetic balance accelerometer having a capacitance pickoff, a fixed frame providing a magnetic circuit having axially spaced annular gaps traversed radially by magnetic lines of force, a first dielectric body mounted within the frame between said gaps and having a cylindrical surface substantially flush with one of the peripheral surfaces of said gaps, a plurality of axially spaced ring shaped condenser plates coaxial with said gaps and embedded in said first dielectric body, an acceleration sensitive element comprising a non-magnetic metallic tube coaxial with said gaps and having at least one annular ridge formed thereon for coaction as a condenser plate with the aforementioned condenser plates, a pair of coils carried by said tube with one thereof disposed within each of said gaps, a second dielectric body formed upon one surface of the tube, said second dielectric body embedding said coils and having a cylindrical surface in telescoping relation to the cylindrical surface of said first dielectric body, there being clearance provided between said telescoping surfaces, and a plurality of openings through said first dielectric body between adjacent ones of said plates embedded therein for directing gas under pressure into said clearance space for suspending the acceleration sensitive element for axial motion within the frame.

5. In an electromagnetic balance accelerometer having a capacitance pickoff, a fixed frame providing a magnetic circuit having an annular gap traversed radially by magnetic lines of force, a first dielectric body mounted within the frame and having a cylindrical surface coaxial with said gap, at least one ring shaped condenser plate coaxial with said gap and embedded in said first dielectric body, an acceleration sensitive element comprising a non-magnetic metallic tube coaxial with said gap and having at least one annular ridge formed thereon for coaction as a condenser plate with the aforementioned condenser plate, a coil carried by said tube and disposed within said gap, a second dielectric body formed upon one surface of the tube, said second dielectric body embedding said coil and having a cylindrical surface in telescoping relation to the cylindrical surface of said first dielectric body, there being clearance provided between said telescoping surfaces, and a plurality of openings through said first dielectric body adjacent said plate embedded therein for directing gas under pressure into said clearance space for suspending the acceleration sensitive element for axial motion within the frame.

6. In an electromagnetic balance accelerometer having a capacitance pickoff, a fixed frame providing a magnetic circuit having an annular gap traversed radially by magnetic lines of force, a dielectric body mounted within the frame between said gaps and having a cylindrical surface coaxial with said gap, a ring shaped condenser plate coaxial with said gap and embedded in said dielectric body, the surface of said plate being flush with said cylindrical surface, an acceleration sensitive element comprising a nonmagnetic tube coaxial with said gaps and having a ring shaped plate for coaction as a condenser plate with the aforementioned condenser plate, a coil carried by said tube and disposed in said gap, the body of said tube adjacent the plate thereof being of dielectric material having a cylindrical surface flush with that of the plate and arranged in telescoping relation to the cylindrical surface of said dielectric body for directing gas under pressure into said clearance space to provide an air film for supporting the acceleration sensitive element and separating said plates.

7. In an accelerometer having a capacitance pickoff, a first dielectric body having a cylindrical surface, a ring shaped condenser plate embedded in said body, an acceleration sensitive element comprising a non-magnetic metallic tube concentric with said cylindrical surface and having an annular ridge formed thereon for coaction as a condenser plate with the aforementioned condenser plate, a second dielectric body formed upon one surface of the tube and having a cylindrical surface in telescoping relation to the cylindrical surface of said first dielectric body, there being clearance provided between said telescoping surfaces, and said first dielectric body having a passage extending into said clearance for directing gas under pressure into said clearance for suspending the acceleration sensitive element for axial motion.

8. In an accelerometer having a capacitance pickoff, a first dielectric body having a cylindrical surface, a ring shaped condenser plate supported by said first dielectric body and having a surface flush with said cylindrical surface, an acceleration sensitive element comprising a non-magnetic metallic tube having an annular ridge formed thereon for coaction as a condenser plate with the aforementioned condenser plate, a second dielectric body formed upon one surface of the tube, said second dielectric body having a cylindrical surface flush with the surface of said annular ridge and being in telescoping relation to the cylindrical surface of said first dielectric body, there being clearance provided between said telescoping surfaces, and said first dielectric body having a passage extending therethrough for directing gas under pressure into said clearance space to provide an air film suspending the acceleration sensitive element and separating said plate from said annular ridge.

9. An acceleration responsive element for an electromagnetic accelerometer having a capacitance pickoff, said element comprising a non-magnetic metallic tube having an annular ridge formed therein, a coil around said tube to one side of the ridge, and a dielectric body formed upon the surface of the tube on each side of said ridge, said dielectric body embedding said coil, and the surface of said dielectric body being cylindrical and flush with the surface of said ridge.

ROBERT L. COSGRIFF.
EDWARD L. WALLS, JR.

REFERENCES CITED

The following references are of record in the file of this patent:

UNITED STATES PATENTS

| Number | Name | Date |
|---|---|---|
| 1,826,024 | Roller | Oct. 6, 1931 |
| 2,136,219 | Scherbatskoy | Nov. 8, 1938 |
| 2,193,910 | Wilson | Mar. 19, 1940 |
| 2,371,040 | Fisher | Mar. 6, 1945 |
| 2,498,997 | McLean et al. | Feb. 28, 1950 |